United States Patent [19]

Allongue

[11] Patent Number: 5,240,205
[45] Date of Patent: Aug. 31, 1993

[54] ANTI-TORQUE SYSTEM FOR HELICOPTERS

[75] Inventor: Marc Allongue, Marseille, France

[73] Assignee: Aerospatiale Societe Nationale Industrielle, Paris, France

[21] Appl. No.: 905,471

[22] Filed: Jun. 29, 1992

[30] Foreign Application Priority Data

Jul. 16, 1991 [FR] France ............... 91 08973

[51] Int. Cl.⁵ ............................................. B64C 27/82
[52] U.S. Cl. ................................................. 244/17.19
[58] Field of Search ............... 244/17.19, 17.13, 17.11, 244/17.21, 75 R

[56] References Cited

U.S. PATENT DOCUMENTS

| | | | |
|---|---|---|---|
| 2,322,715 | 6/1943 | Kloeren | 244/7 |
| 2,369,652 | 2/1945 | Avery | 244/17 |
| 2,609,053 | 9/1952 | Lee | 170/135.22 |
| 4,200,252 | 4/1980 | Logan et al. | 244/17.19 |
| 4,585,391 | 4/1986 | Vuillet et al. | 415/210 |
| 4,708,305 | 11/1987 | Kelley et al. | 244/17.19 |

FOREIGN PATENT DOCUMENTS

| | | | |
|---|---|---|---|
| 1332300 | 6/1963 | France . | |
| 2412462 | 7/1979 | France . | |
| 289248 | 4/1928 | United Kingdom . | |
| 2238995 | 6/1991 | United Kingdom | 244/17.19 |
| 2238996 | 6/1991 | United Kingdom . | |

*Primary Examiner*—Galen Barefoot
*Attorney, Agent, or Firm*—Fisher, Christen & Sabol

[57] ABSTRACT

A rotating wing aircraft of helicopter type is provided, according to the invention, with an anti-torque system which comprises, in combination, an auxiliary tail rotor, a vertical tail fin developing lateral lift and optionally provided with a trailing edge control surface, and a blower device.

8 Claims, 2 Drawing Sheets

ANTI-TORQUE SYSTEM FOR HELICOPTERS

The present invention relates to an anti-torque system for helicopters and to a helicopter provided with such an anti-torque system. It relates more particularly to helicopters in which the single main lift and propulsion rotor is rotated mechanically.

BACKGROUND OF THE INVENTION

For example, from the following documents: GB-A-289 248, U.S. Pat. No. 2,322,715, U.S. Pat. No. 2,369,652, and U.S. Pat. No. 2,609,053, anti-torque systems for rotating wing aircraft are known that include an auxiliary rotor having an axis extending transversely relative to the fuselage of said aircraft and disposed in the vicinity of the tail end thereof. Such a tail rotor may be used not only to counterbalance the torque exerted on the fuselage by driving the main lift and propulsion rotor, but also to control the yaw of the aircraft.

Such anti-torque systems using an auxiliary rotor are particularly reliable and efficient. They are suitable for providing on a permanent basis during all stages of flight the transverse thrust required for providing the anti-torque effect and for controlling yaw. They nevertheless suffer sometimes from being heavy and noisy, and also from requiring considerable power. Nevertheless, when implemented in the most modern ways, as illustrated by document U.S. Pat. No. 4,585,391 for example, the mass, noise generated, and power required are all greatly reduced. In addition, it may be observed that when faired, an auxiliary rotor anti-torque system is entirely satisfactory with respect to safety, both in the air and on the ground.

Furthermore, the document FR-A-1 332 300 describes an anti-torque system for a rotating wing aircraft which operates by blowing, making use of the principle of a flow of air around the tail boom of the aircraft. Air under pressure flowing along the boom of the aircraft is ejected via longitudinal side slots pointing downwards and disposed vertically beneath the vertical downdraft from the rotating wing. This gives rise to a transverse aerodynamic force on said fuselage suitable for opposing the driving torque of the main lift and propulsion rotor, providing said slots are formed in the appropriate side of the fuselage.

Such anti-torque systems based on blowing are mechanically simple, however they are not efficient under certain circumstances in flight, in particular when the main rotor is not providing lift, e.g. when flying downwards, since under such circumstances, there is no longer a flow of air around the tail boom. In addition, they are also not effective when flying at high speed, since under such circumstances the forwards longitudinal speed component is much greater than the vertical component from the rotating wing, thereby cancelling the blowing effect.

In order to attempt to remedy these shortcomings of anti-torque systems based on blowing, document U.S. Pat. No. 4,200,252 provides additional means for generating a lateral jet suitable for providing an additional anti-torque force, and for enabling yaw maneuvers to be performed during all stages of flight.

Nevertheless, although the composite anti-torque system of document U.S. Pat. No. 4,200,252 provides good handling, good stability, and little sensitivity to side wind, it requires power that is not less than the power required by a high-performance anti-torque system using a faired rotor. The efficiency of the lateral jet is low. Thus, when hovering in the absence of wind, the power required is close to that required by a high-performance anti-torque system having a faired rotor. However, when the side wind is significant, the power required becomes significantly greater than that required by such a high performance anti-torque system. In addition, the mass of such a composite anti-torque system is not less than that of an anti-torque system having a faired rotor.

An object of the present invention is to provide an improved anti-torque system having a tail rotor and that makes it possible to increase the takeoff mass for a given diameter of anti-torque rotor, or for a given takeoff mass makes it possible to use a smaller diameter of anti-torque rotor, while simultaneously reducing the amount of noise generated, particularly during takeoff, landing, and hovering.

SUMMARY OF THE INVENTION

To this end, the present invention provides an anti-torque system for a helicopter having a single mechanically driven main lift and propulsion rotor and a rearwardly elongate fuselage, of the type comprising:

an auxiliary anti-torque rotor whose axis is substantially transversal relative to said elongate fuselage and which is disposed at the rear end of said fuselage to generate a first transverse force opposing the torque exerted on said fuselage by applying rotary drive to the main rotor of said helicopter;

together with first means for controlling said auxiliary anti-torque rotor, enabling the magnitude of said first transverse force to be controlled;

which system is remarkable in that it further comprises:

a blowing anti-torque device comprising at least one longitudinal slot formed laterally in the portion of said elongate fuselage which is subjected to the downdraft from said main rotor, which longitudinal slot is fed with fluid under pressure that it ejects downwards in a manner that is at least approximately tangential to said portion of the fuselage, thereby generating a second transverse force in the same direction as said first transverse force;

second control means for controlling said blowing anti-torque device and enabling the magnitude of said second transverse force to be controlled; and at least one vertical tail fin disposed at the rear end of said elongate fuselage and having a profile such that during forwards flight it generates lateral lift in the same direction as said first and second transverse forces and of a magnitude such that said lateral lift provides at least the major portion of the anti-torque function during forwards flight; and in that:

when hovering or flying at a very low forwards speed said blowing anti-torque device provides at least the major fraction of the anti-torque function; while under all flight circumstances, the auxiliary anti-torque rotor provides yaw control for the aircraft together with the remainder of the anti-torque function.

Thus, by means of the present invention, the anti-torque auxiliary rotor serves during forwards flight merely to control the yaw of the helicopter, and when hovering it provides no more than a fraction of the anti-torque function.

The auxiliary anti-torque rotor can therefore be small in size such that its mass, and the noise it generates, and the power it requires are all relatively small, particularly since it may be of the high-efficiency faired type.

Preferably, the auxiliary anti-torque rotor and the blowing anti-torque device are designed so that when hovering the anti-torque function is provided up to 70% by the blowing anti-torque device and to at least 30% by the auxiliary anti-torque rotor.

This achieves a compromise in which the mass, the noise, and the power consumed by the auxiliary anti-torque rotor are all small.

It will also be understood that reducing the size and the power of the auxiliary anti-torque rotor gives rise to a saving in mass, thereby increasing the payload of the helicopter.

Advantageously, the profile of said vertical rear tail fin is such that during forward flight at the nominal cruising speed, said lateral lift provides the entire anti-torque function and also the yaw stability of the aircraft. Thus, only yaw control is provided by the auxiliary anti-torque rotor, thus enabling it to be very small.

In order to be able to adjust the value of said lateral lift as a function of forward speed, it is preferable to provide a trailing edge control surface on said vertical tail member, together with third control means for controlling said control surface.

It is advantageous for said first and second control means, together possibly also with said third control means to be combined so as to be controllable from a single actuator fin. The single actuator member may be a rudder bar made available to the helicopter pilot.

In known manner, the auxiliary anti-torque rotor may be of the type having variable pitch blades. Under such circumstances, the said first control means may control the magnitude of said first transverse force by controlling the pitch of the blades of said auxiliary anti-torque rotor.

The said longitudinal slot may be fed with fluid by the exhaust gases of the engine unit of said aircraft via an adjustable valve. Under such circumstances, said second control means control the magnitude of said second transverse force by controlling said valve.

However, in a variant, said longitudinal slot may be fed with fluid from a mechanical blower provided for this purpose on board said aircraft, said second control means then controlling the magnitude of said second transverse force by controlling said mechanical blower. Such control can then be obtained by adjusting the pitch of the variable pitch vanes of said mechanical blower.

In which case, it is possible to provide coupling between the pitch control for the blades of the auxiliary anti-torque rotor and the pitch control for the vanes of the mechanical blower in such a manner as to ensure that controlled variation in the pitch of one of those rotary devices gives rise to simultaneous variation in the pitch of the other one.

Naturally, said first, second, and third control means are coupled with the conventional control means of the aircraft. Such coupling may be obtained by the position of the feet (as mentioned above), or by the collective pitch control, or else by controlling the longitudinal cyclic pitch.

The present invention also provides a helicopter having such an anti-torque system.

To this end, the invention provides a helicopter having a single mechanically-driven lift and propulsion rotor and a fuselage that is rearwardly elongate and that is provided with an anti-torque system comprising:

an auxiliary anti-torque rotor whose axis is substantially transverse relative to said elongate fuselage and which is disposed at the rear end of said fuselage to generate a first transverse force opposing the torque exerted on the fuselage by driving the lift and propulsion rotor of said helicopter;

together with first control means for controlling said auxiliary anti-torque rotor enabling the magnitude of said first transverse force to be controlled;

which helicopter is remarkable in that said anti-torque system further includes:

a blowing anti-torque device comprising at least one longitudinal slot formed in the side of the portion of said elongate fuselage which is subjected to the downdraft from said lift and propulsion rotor, said longitudinal slot being fed with fluid under pressure that it ejects downwards in a manner that is at least approximately tangential to said portion of the fuselage to generate a second transverse force in the same direction as said first force;

second control means for said blowing anti-torque device enabling the magnitude of said second transverse force to be controlled; and at least one vertical tail fin disposed at the rear end of said elongate fuselage and profiled in such a manner that during forwards flight it generates lateral lift in the same direction as said first and second transverse forces and of a magnitude such that said lateral lift provides at least the major fraction of the anti-torque function during forwards flight; and in that:

when hovering or when moving forwards at very low speed, said blowing anti-torque device provides at least the major fraction of the anti-torque function;

whereas under all flight circumstances, the auxiliary anti-torque rotor provides yaw control for the helicopter and provides the remainder of the anti-torque function.

The various different improvements described above may then be included in the anti-torque system of the helicopter.

BRIEF DESCRIPTION OF THE DRAWINGS

Embodiments of the invention are described by way of example with reference to the accompanying drawings, in which.

DETAILED DESCRIPTION

Figure 1:
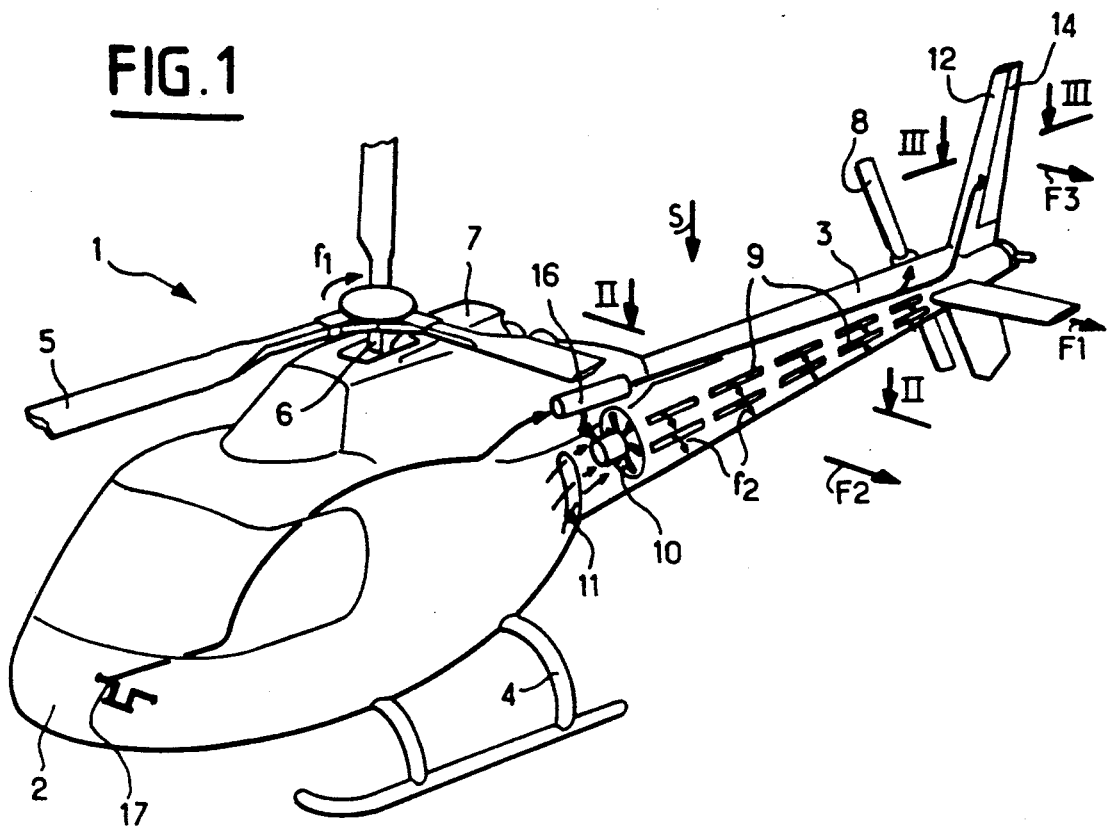
FIG. 1 is a diagrammatic perspective view of a helicopter provided with a composite anti-torque system of the present invention.

In the drawings, identical references designate items that are identical or similar.

The helicopter 1 of the present invention and shown in FIG. 1 comprises, at the front, a cabin 2 which is extended rearwards by a tail boom 3. It is provided with landing gear 4 and a main rotor for lift and propulsion 5. This main rotor is suitable for being rotated about its axis by an engine unit 7 (arrow f1). Applying rotary drive to the rotor 5 by mechanical transmission means imparts torque to the fuselage 2, 3 tending to rotate the fuselage about the axis of rotation 6.

At the rear end of the boom 3, the helicopter 1 includes a variable pitch auxiliary anti-torque rotor 8 which, when rotating about its own axis (not shown in FIG. 1) extending transversely to the boom 3, generates a transverse force F1 which opposes the torque exerted on said fuselage 2, 3 by driving the main rotor 5.

In addition, longitudinally extending lateral slots 9 are provided along the boom 3 of the helicopter 1 and a flow of gas flowing along said boom 3 is discharged therethrough, which gas comes either from the engine unit 7 (exhaust gas) or else and as shown in the figures, from a mechanical blower 10 having variable pitch vanes, provided for this purpose and fed with air from air intakes 11 formed in the fuselage.

The region of the boom 3 through which the slots 9 are formed is subjected to the downdraft from the main rotor 5 (arrow S).

Figure 2:
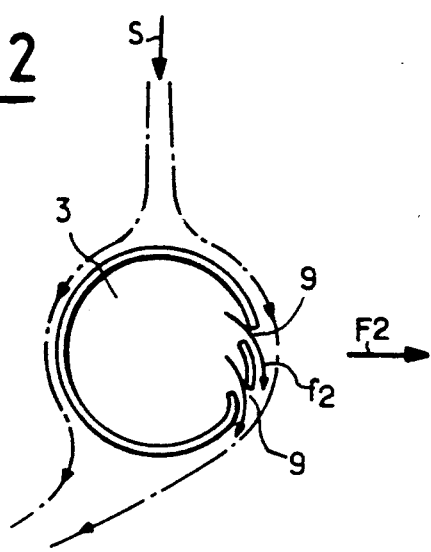
FIGS. 2 and 3 are respective cross-sections on lines II—II and III—III of FIG. 1 (and also of FIG. 4)

Thus, and as explained in document FR-A-1 332 300, when the slots 9 eject downwards in a manner that is at least approximately tangential to the boom 3, with the flow of gas running along the boom 3 (see arrows f2 in FIGS. 1 and 2), and while the rotor 5 is rotating, a force F2 appears which tends to oppose the torque exerted on the fuselage 2, 3 by driving the main rotor 5.

Figure 3:
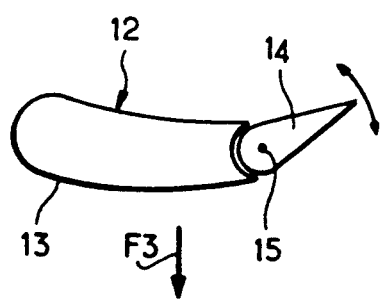

In addition, at the rear end of the boom 3, a vertical tail fin 12 is provided whose profile 13 is suitable, while the helicopter 1 is in forwards flight, for generating lateral lift F3 which opposes the torque exerted on the fuselage 2, 3 by the main rotor 5 (see also FIG. 3). The trailing edge of the vertical tail fin 12 may optionally be provided with a control surface 14 suitable for rotating about a vertical axis 15.

A control device 16 is provided on board the helicopter 1 for being actuated by a rudder bar 17 placed at the feed of the pilot. The control device 16 controls both the pitch of the auxiliary rotor 8 and the flow rate of the fluid passing through the slots 9, thereby controlling the magnitude of the forces F1 and F2. When the fluid passing through the slots 9 is constituted by the exhaust gases of the engine unit 7, then the device 16 controls a valve (not shown) through which said exhaust gases pass on their way towards the slots 9. In the circumstances shown in FIG. 1 where the fluid passing through the slots 9 is air blown by a blower 10, then the device 16 controls said blower, e.g. by controlling the pitch of the vanes in its rotor.

If present, the control surface 14 is also controlled by the device 16 in order to control the magnitude of the force F3.

In FIG. 1, the various connections between the rudder bar 17 and the control device 16, and between said control device and the rotor 8, the blower 10, and the control surface 14 are shown by bold lines.

It will be observed that the coupling between the pitch of the blades of the rotor 8 and the pitch of the vanes of the blower 10 (or the valve controlling the exhaust gases from the engine unit 7) can be provided mechanically, hydraulically, or electrically.

In any event, the action of the device 16 is such that:
in forwards flight, the anti-torque function and yaw stability are provided by the lateral lift F3 from the tail fin 12, possibly in association with the control surface 14, while yaw control is obtained by the transverse force F1 generated by the auxiliary rotor 8; and while hovering or flying at a slow forwards speed, up to 70% of the anti-torque function is provided by the transverse force F2 generated by the blower 10 (or by the exhaust gases from the engine unit 7) and at least 30% thereof is provided by the auxiliary rotor 8, which rotor also provides yaw control for the helicopter under such circumstances.

Figure 4:
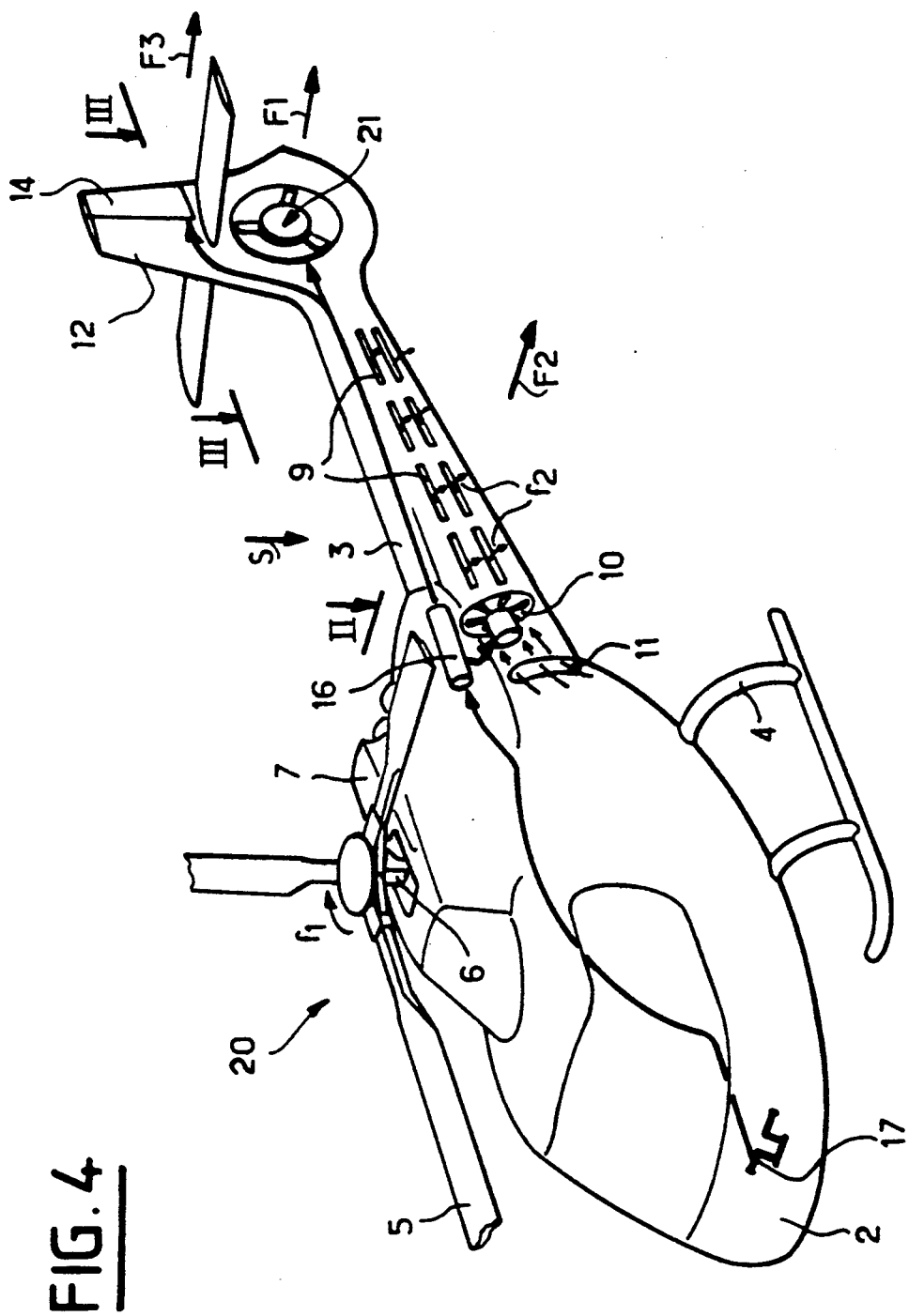
FIG. 4 is a diagrammatic perspective view of a helicopter provided with a variant embodiment of the composite anti-torque system of the present invention.

The helicopter 20 shown in FIG. 4 is essentially identical to the helicopter 1 shown in FIG. 1. However, in FIG. 4, the auxiliary anti-torque rotor 8 is replaced by an improved faired rotor 21 of the type known under the registered trademark Fenestron. Since the performance of the rotor 21 is optimized, it can be smaller than the auxiliary rotor 8, thereby further reducing mass, noise generation, and the power required to drive the rotor 21.

I claim:

1. An anti-torque system for a helicopter having a single mechanically-driven main lift and propulsion rotor and a rearwardly elongate fuselage, comprising in combination:

an auxiliary anti-torque rotor whose axis is substantially transversal relative to said elongate fuselage and which is disposed at the rear end of said fuselage to generate a first transverse force opposing the torque exerted on said fuselage by said main rotor of said helicopter;

a blowing anti-torque device comprising at least one longitudinal slot formed laterally in the portion of said elongate fuselage which is subjected to the downdraft from said main rotor, which longitudinal slot is fed with fluid under pressure so that it ejects downwards in a manner that is at least approximately tangential to said portion of the fuselage, thereby generating a second transverse force in the same direction as said first transverse force;

at least one vertical fin disposed at the rear end of said elongate fuselage and having a profile such that during forward flight it generates lateral lift in the same direction as said first and second transverse forces;

first control means for controlling said auxiliary anti-torque rotor, enabling the magnitude of said first transverse force to be controlled;

second control means for controlling said blowing anti-torque device and enabling the magnitude of said second transverse force to be controlled;

said first and second control means being combined to be controllable from a single actuator member; wherein:

in stationary flight or in forward flight at a very low forward speed, up to 70 percent of the anti-torque function is provided by the blower anti-torque device and at least 30 percent thereof is provided by said auxiliary anti-torque rotor;

in forward flight at a nominal cruising speed, said lateral lift generated by said vertical tail fin provides all of the anti-torque function, together with the yaw stability of the aircraft; and under all flight circumstances, the auxiliary anti-torque rotor provides yaw control for the aircraft together with the possible remainder of the anti-torque function.

2. The system according to claim 1, wherein said vertical tail fin includes a trailing edge control surface and wherein third control means is provided for controlling said control surface.

3. The system according to claim 2, wherein said third control means is combined with said first and second control means so as to be controllable from said single actuator member.

4. The system according to claim 1, wherein said first control means controls the magnitude of said first transverse force by controlling the pitch of the blades of said auxiliary anti-torque rotor.

5. The system according to claim 1, wherein said longitudinal slot is fed with the exhaust gases from the engine unit of said aircraft via a valve, and wherein said second control means controls the magnitude of said second transverse force by controlling said valve.

6. The system according to claim 1, wherein said longitudinal slot is fed with air by a blower machine and wherein said second control means controls the magnitude of the second transverse force by controlling said blower machine.

7. The system according to claim 4, including coupling between pitch control of the blades of the auxiliary anti-torque rotor and pitch control of the vanes of the blower machine.

8. A helicopter having a single mechanically-driven main lift and propulsion rotor and a rearwardly elongate fuselage, comprising in combination:

an auxiliary anti-torque rotor whose axis is substantially transversal relative to said elongate fuselage and which is disposed at the rear end of said fuselage to generate a first transverse force opposing the torque exerted on said fuselage by said main rotor of said helicopter;

a blowing anti-torque device comprising at least one longitudinal slot formed laterally in the portion of said elongate fuselage which is subjected to the downdraft from said main rotor, which longitudinal slot is fed with fluid under pressure so that it ejects downwards in a manner that is at least approximately tangential to said portion of the fuselage, thereby generating a second transverse force in the same direction as said first transverse force;

at least one vertical tail fin disposed at the rear end of said elongate fuselage and having a profile such that during forward flight it generates lateral lift in the same direction as said first and second transverse forces;

first control means for controlling said auxiliary anti-torque rotor, enabling the magnitude of said first transverse force to be controlled;

second control means for controlling said blowing anti-torque device and enabling the magnitude of said second transverse force to be controlled; and said first and second control means being combined to be controllable from a single actuator member; wherein:

in stationary flight or in forward flight at a very low forward speed, up to 70 percent of the anti-torque function is provided by the blower anti-torque device and at least 30 percent thereof is provided by said auxiliary anti-torque rotor;

in forward flight at a nominal cruising speed, said lateral lift generated by said vertical tail fin provides all of the anti-torque function, together with the yaw stability of the aircraft; and under all flight circumstances, the auxiliary anti-torque rotor provides yaw control for the aircraft together with the possible remainder of the anti-torque function.

* * * * *